(12) United States Patent
Yamaguchi et al.

(10) Patent No.: US 8,398,495 B2
(45) Date of Patent: Mar. 19, 2013

(54) COUPLING DEVICE FOR ROTATIONALLY COUPLING DRIVE SHAFT AND DRIVEN SHAFT

(75) Inventors: Takahiro Yamaguchi, Kariya (JP); Junichi Maeda, Takahama (JP)

(73) Assignees: Advics Co., Ltd., Kariya-Shi, Aichi-Ken (JP); Denso Corporation, Kariya-Shi, Aichi-Ken (JP)

( * ) Notice: Subject to any disclaimer, the term of this patent is extended or adjusted under 35 U.S.C. 154(b) by 173 days.

(21) Appl. No.: 12/898,126

(22) Filed: Oct. 5, 2010

(65) Prior Publication Data

US 2011/0250976 A1 Oct. 13, 2011

(30) Foreign Application Priority Data

Oct. 7, 2009 (JP) ................................. 2009-233046

(51) Int. Cl.
 *F16D 1/12* (2006.01)
(52) U.S. Cl. ........................................................ 464/160
(58) Field of Classification Search .................. 464/160, 464/182; 403/354, 360, 375
See application file for complete search history.

(56) References Cited

U.S. PATENT DOCUMENTS

| 3,184,270 A | * | 5/1965 | Ruhala | ...................... 403/375 X |
| 5,848,334 A | * | 12/1998 | Kamola | .................... 464/160 X |
| 6,712,429 B2 | * | 3/2004 | Villarroel | |
| 6,883,480 B1 | * | 4/2005 | Sluka et al. | ............... 464/160 X |

FOREIGN PATENT DOCUMENTS

| DE | 2 326 951 | * 12/1973 | .................... 464/160 |
| JP | 2004-68836 A | 3/2004 | |

* cited by examiner

*Primary Examiner* — Gregory Binda
(74) *Attorney, Agent, or Firm* — Buchanan Ingersoll & Rooney PC (57) ABSTRACT

A coupling device comprises a drive portion formed on a drive shaft and having a drive wall surface extending in the direction of a rotation axis; a driven portion formed on a driven shaft and having a driven wall surface extending in the direction of the rotation axis; a convex curved portion formed on one of the drive wall surface and the driven wall surface and extending along the rotation axis at a position spaced from the rotation axis as viewed in the direction of the rotation axis; and a concave curved portion having a smaller curvature than that of the convex curved portion and formed on the other of the drive wall surface and the driven wall surface to contact the convex curved portion and extending along the rotation axis at a position spaced from the rotation axis as viewed in the direction of the rotation axis.

10 Claims, 7 Drawing Sheets

COUPLING DEVICE FOR ROTATIONALLY COUPLING DRIVE SHAFT AND DRIVEN SHAFT

INCORPORATION BY REFERENCE

This application is based on and claims priority under 35 U.S.C. 119 with respect to Japanese Application No. 2009-233046 filed on Oct. 7, 2009, the entire content of which is incorporated herein by reference.

BACKGROUND OF THE INVENTION

1. Field of the Invention

The present invention relates to a coupling device for rotationally coupling a drive shaft of a drive device and a driven shaft of an operation device on a common axis.

2. Discussion of the Related Art

For example, in a vehicle brake system, it is carried out to supply wheel cylinders with a hydraulic pressure which is generated in a master cylinder as a result that the driver steps a brake pedal, to apply a brake force to wheels by pressing brake pads against brake discs and at the same time, to apply a brake force to the wheels by generating a hydraulic pressure from a pump driven by an electric motor and by supplying the pump-generated hydraulic pressure to the wheel cylinders.

JP2004-68836 A (hereafter referred to as Patent Document 1) describes a coupling device, wherein a coupling recess 91 is formed on an end portion of a motor shaft 90 of an electric motor in a vehicle brake system, wherein a coupling protrusion 81 which is engaged with the coupling recess 91 is formed on an end portion of a pump shaft 80 of a pump, and wherein opposite inner wall surfaces of the coupling recess 91 press radially outer edge corners of the coupling protrusion 81 to transmit a rotation power from the motor shaft 90 to the pump shaft 80.

In the coupling device described in Patent Document 1, since the rotation power is transmitted as a result that the opposite inner wall surfaces of the coupling recess 91 press the acute radially outer edge corners of the coupling protrusion 81, a surface pressure (i.e., contact strength) at each of the contact portions between the coupling recess 91 and the coupling protrusion 81 becomes high, and the opposite inner wall surfaces of the coupling recess 91 and the radially outer edge corners of the coupling protrusion 81 wear within a short period of time in use. Thus, it occurs that the rotation power is transmitted with the worn radially outer edge corners of the coupling protrusion 81 fitted in depressed grooves which are formed on the coupling recess 91 due to the wear, and this gives rise to an apprehension that smooth and gentle transmission of the rotation power from the electric motor to the pump becomes impossible within a short period of service life. In particular, the aforementioned wear is accelerated by the relative movement in radial direction which is caused between the shaft 90 of the electric motor and the shaft 80 of the pump due to a slight axial misalignment therebetween.

Further, in recent years, in vehicle brake systems, the use of an antilock brake system, a traction control system, a yaw control system or the like has been increasing, or a so-called "by-wire brake system" has been developed which generates a hydraulic pressure from a pump driven by an electric motor in proportion to a hydraulic pressure generated as a result of the driver stepping a brake pedal and which applies the pump-generated hydraulic pressure to wheel cylinders to apply an ordinary brake force to wheels. This results in remarkably increasing the frequency and time period in use of the pump driven by the electric motor in the vehicle brake system.

Further, in vehicle brake systems, the electric motor and the pump are required to be reduced in dimension and weight, wherein the motor shaft and the pump shaft are required to be decreased in diameter. With decreases in diameter of the shafts, a surface pressure is increased at the contact portion between the coupling recess and the coupling protrusion of the coupling device, which results in further shortening the service life of the coupling device. Under these circumstances, it is strongly desired to extend the service life of the coupling device.

SUMMARY OF THE INVENTION

Accordingly, it is a primary object of the present invention to provide an improved coupling device capable of not only extending the service life but also transmitting a rotation power smoothly and gently.

Briefly, according to the present invention in a first aspect, there is provided an improved coupling device for rotationally coupling a drive shaft of a drive device and a driven shaft of an operation device which are arranged on a rotation axis. The coupling device comprises a drive portion formed on the drive shaft to face in the circumferential direction and having a drive wall surface extending in the direction of the rotation axis; a driven portion formed on the driven shaft to face the drive wall surface and having a driven wall surface extending in the direction of the rotation axis; a convex curved portion formed on one of the drive wall surface and the driven wall surface and extending along the rotation axis at a position spaced from the rotation axis as viewed in the direction of the rotation axis; and a concave curved portion having a smaller curvature than that of the convex curved portion and formed on the other of the drive wall surface and the driven wall surface to contact the convex curved portion and extending along the rotation axis at a position spaced from the rotation axis as viewed in the direction of the rotation axis.

With this construction, the convex curved portion is formed on one of the drive wall surface of the drive portion formed on the drive shaft and the driven wall surface of the driven portion formed on the driven shaft and extends along the rotation axis at the position spaced from the rotation axis as viewed in the direction of the rotation axis, and the concave curved portion having a smaller curvature than that of the convex curved portion is formed on the other of the drive wall surface and the driven wall surface to contact the convex curved portion and extends along the rotation axis at the position spaced from the rotation axis as viewed in the direction of the rotation axis and. Thus, when a rotation power is transmitted from the drive shaft to the driven shaft, the surface pressure (i.e., contact strength) at the contact portion between the convex curved portion and the concave curved portion is made to be low or small. As a result, wears at the contact portion decrease, and the relative movement caused by a misalignment between the drive shaft and the driven shaft becomes smooth, so that it is possible to extend the service life of the coupling device and to operate the same gently and smoothly.

According to the present invention in a second aspect, there is provided an improved coupling device for rotationally coupling a drive shaft of a drive device and a driven shaft of an operation device which are arranged on a rotation axis. The coupling device in the second aspect comprises a coupling protrusion formed on one of the drive shaft and the driven shaft and having two outer wall surfaces extending mutually in parallel in the direction of the rotation axis; a coupling recess formed on the other of the drive shaft and the driven shaft and having two inner wall surfaces extending mutually in parallel in the direction of the rotation axis to be engaged with the coupling protrusion; convex curved portions respectively formed on the two outer wall surfaces of the coupling protrusion and extending along the rotation axis at positions which are point-symmetrical with respect to the rotation axis as viewed in the direction of the rotation axis; and concave curved portions each having a smaller curvature than that of a corresponding one of the convex curved portions and respectively formed on the two inner wall surfaces of the coupling recess and extending along the rotation axis at positions which are point-symmetrical with respect to the rotation axis as viewed in the direction of the rotation axis, to contact the convex curved portions.

With the construction in the second aspect, the convex curved portions are respectively formed on the two outer wall surfaces of the coupling protrusion which is formed on one of the drive shaft and the driven shaft arranged on the rotation axis, to extend along the rotation axis at the positions which are point-symmetrical with respect to the rotation axis as viewed in the direction of the rotation axis, and the concave curved portions each having a smaller curvature than that of the corresponding one of the convex curved portions are respectively formed on the two inner wall surfaces of the coupling recess which is formed on the other of the drive shaft and the driven shaft and which is engaged with the coupling protrusion, and extend along the rotation axis at the positions which are point-symmetrical with respect to the rotation axis as viewed in the direction of the rotation axis, to contact the convex curved portions. Thus, when a rotation power is transmitted from the drive shaft to the driven shaft, the surface pressure at the contact portion between each convex curved portion and the corresponding concave curved portion is made to be low or small. As a result, wears at the contact portions decrease, and the relative movement caused by a misalignment therebetween becomes smooth, so that it is possible to extend the service life of the coupling device and to operate the same gently and smoothly.

According to the present invention in a third aspect, there is provided an improved coupling device for rotationally coupling a drive shaft of a drive device and a driven shaft of an operation device which are arranged on a rotation axis. The coupling device in the third aspect comprises a coupling protrusion formed on one of the drive shaft and the driven shaft and having two outer wall surfaces extending mutually in parallel in the direction of the rotation axis; a coupling recess formed on the other of the drive shaft and the driven shaft and having two inner wall surfaces extending mutually in parallel in the direction of the rotation axis to be engaged with the coupling protrusion; convex curved portions respectively formed on the two inner wall surfaces of the coupling recess and extending along the rotation axis at positions which are point-symmetrical with respect to the rotation axis as viewed in the direction of the rotation axis; and concave curved portions each having a smaller curvature than that of a corresponding one of the convex curved portions and respectively formed on the two outer wall surfaces of the coupling protrusion and extending along the rotation axis at positions which are point-symmetrical with respect to the rotation axis as viewed in the direction of the rotation axis, to contact the convex curved portions.

With the construction in the third aspect, the convex curved portions are respectively formed on the two inner wall surfaces of the coupling recess which is formed on one of the drive shaft and the driven shaft arranged on the rotation axis, to extend along the rotation axis at the positions which are point-symmetrical with respect to the rotation axis as viewed in the direction of the rotation axis, and the concave curved portions each having a smaller curvature than that of the corresponding one of the convex curved portions are respectively formed on the two outer wall surfaces of the coupling protrusion which is formed on the other of the drive shaft and the driven shaft and which is engaged with the coupling recess, and extend along the rotation axis at the positions which are point-symmetrical with respect to the rotation axis as viewed in the direction of the rotation axis, to contact the convex curved portions. Thus, it is possible for the coupling device in the third aspect to perform substantially the same functions and effects as the coupling device in the second aspect does.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
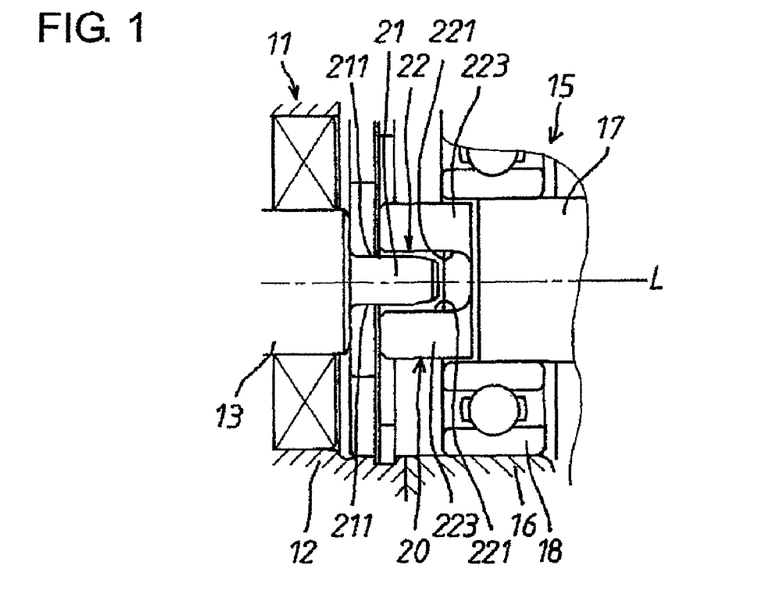
FIG. 1 is a longitudinal sectional view of a coupling device in a first embodiment in which the present invention is applied to rotation coupling between a motor shaft and a pump shaft.

Hereafter, a coupling device 20 in a first embodiment according to the present invention will be described with reference to FIGS. 1 and 2. In FIG. 1, a numeral 11 denotes a pump used in, for example, a vehicle brake system, and a pump shaft 13 with an inner rotor of the pump secured thereon is rotatably supported in a housing 12 of the pump 11.

A reference numeral 15 denotes an electric motor, and a motor shaft 17 with a rotor fixed thereon is rotatably supported by a bearing 18 in a casing 16 of the electric motor 15. The casing 16 of the electric motor 15 is fixed by means of bolts or the like to the housing 12 of the pump 11 so that the motor shaft 17 and the pump shaft 13 are arranged on a rotation axis L. Although it is desirable that the motor shaft 17 and the pump shaft 13 be rotatably supported on the same rotation axis L, a misalignment in the degree that enables the rotation power to be transmitted may exist between the motor shaft 17 and the pump shaft 13.

The motor shaft 17 and the pump shaft 13 are almost the same in diameter and are rotationally coupled by the coupling device 20. The coupling device 20 is composed of a coupling protrusion 21 formed on an end of the pump shaft 13 and a coupling recess 22 which is formed on an end of the motor shaft 17 to be engaged with the coupling protrusion 21. The coupling protrusion 21 is formed by forming diametrically opposite, parallel flat surfaces on a small-diameter end portion of the pump shaft 13 and has two outer wall surfaces 211 extending in parallel in the rotation axis L (strictly speaking in this case, the axis of the pump shaft 13). The coupling recess 22 is formed by cutting a recess groove which is wider than the thickness of the coupling protrusion 21, on the end of the motor shaft 17 across the center of the same from an end surface on the rotation axis L (in this case, strictly speaking, the axis of the motor shaft 17) and has two protruding portions 223 which are formed with two inner wall surfaces 221 extending in the rotation axis L in parallel relation with each other.

Figure 2:
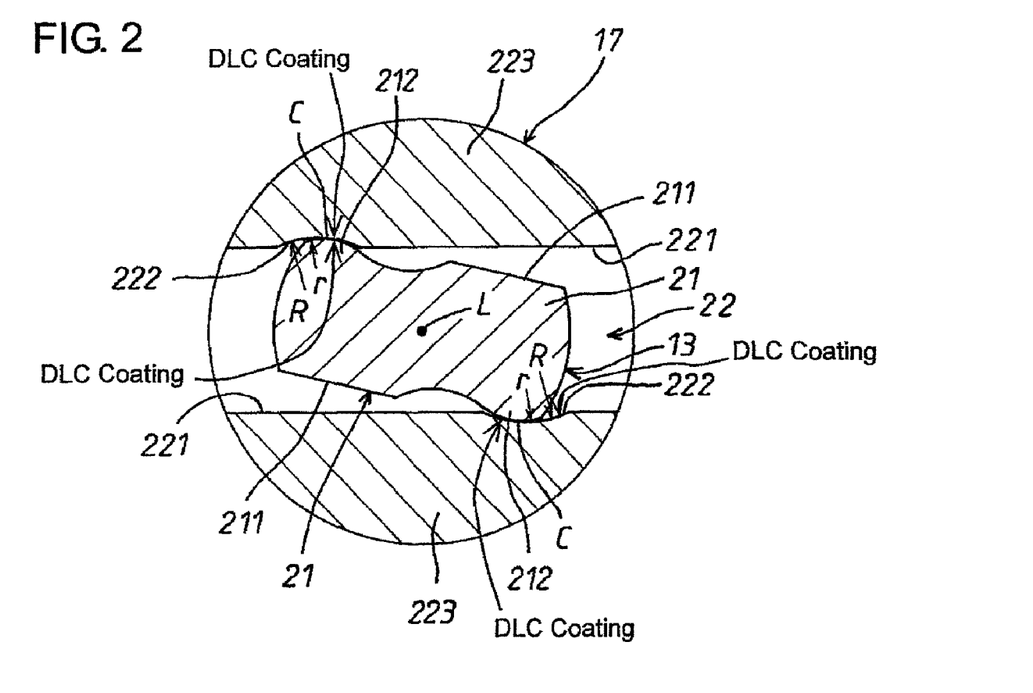
FIG. 2 is a cross-sectional view showing an engaging portion at which a coupling recess and a coupling protrusion of the coupling device are engaged and pressed against each other.

As shown in FIG. 2, on the two outer wall surfaces 211 of the coupling protrusion 21, convex curved portions 212 each representing an arc of a radius (r) in cross-section shape are respectively formed to extend along the rotation axis L at positions which are point-symmetrical with respect to the rotation axis L as viewed in the direction of the rotation axis L. Further, on the two inner wall surfaces 221 of the coupling recess 22, concave curved portions 222 whose arc in cross-section shape has a radius (R) being larger than the radius (r), that is, a radius being small in curvature extend along the rotation axis L at positions which are point-symmetrical with respect to the rotation axis L as viewed in the direction of the rotation axis L. Thus, when the pump 11 is rotationally driven by the electric motor 15, a rotation power is transmitted as the convex curved portions 212 which are formed on radially outer edge portions of the two outer wall surfaces 211 on the coupling protrusion 212 of the pump shaft 13 and which extend in the rotation axis L are pressed by the concave curved portions 222 which are formed on the two inner wall surfaces 221 of the coupling recess 22 of the motor shaft 17 and which extend in the rotation axis L. Since the rotation power is transmitted through contact portions C between the concave curved portions 222 and the convex curved portion 212 which extend in the direction of the rotation axis L, the areas of the contact portions C between the concave curved portions 222 and the convex curved portion 212 are widened, so that the surface pressure (i.e., contact strength) can be reduced.

A misalignment or the like may take place between the motor shaft 17 and the pump shaft 13 in the degree that enables the rotation power to be transmitted, so that the concave curved portions 222 and the convex curved portions 212 relatively displace in the radial direction with rotation of the motor shaft 17 and the pump shaft 13. Even in this case, the reduction in the surface pressure at the contact portions C makes it possible to decrease wears at the contact portions C between the concave curved portions 222 and the convex curved portions 212 and to smoothen the relative movement occurring due to the misalignment. Therefore, it is possible to extend the service life of the coupling device 20 and to transmit the rotation power smoothly and gently.

Figure 3:
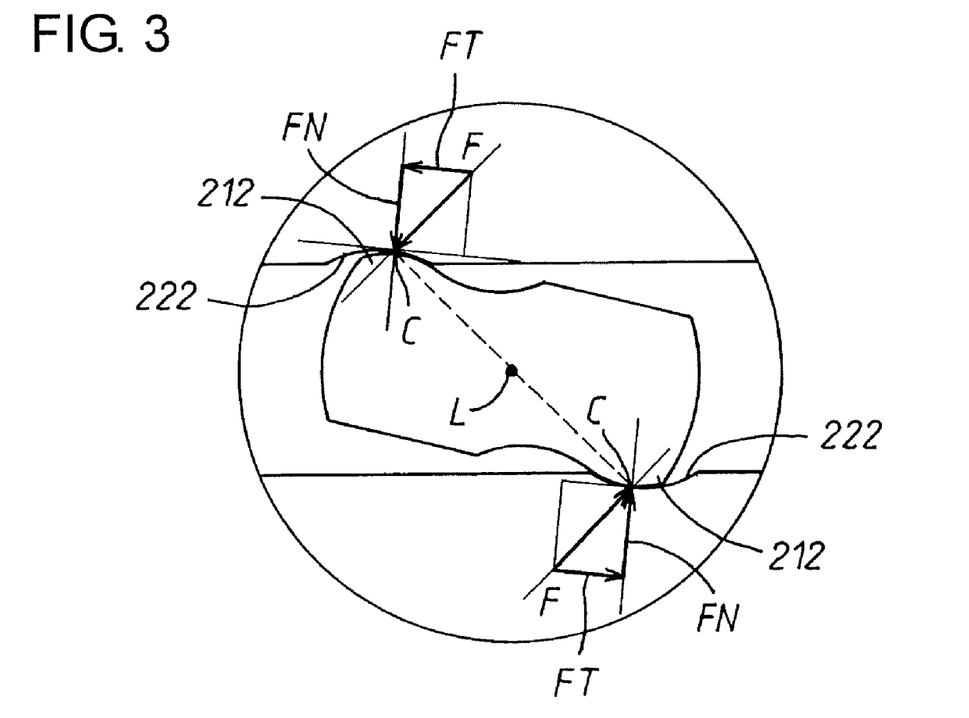
FIG. 3 is a schematic illustration showing the direction of a rotation power in which a concave curved portion presses a convex curved portion at each of the contact portions.

As shown in FIG. 3, the concave curved portions 222 and the convex curved portions 212 are formed so that where consideration is taken into a rotation power F with which each concave curved portion 222 presses each convex curved portion 212 at each contact portion C therebetween, a component (FN) in the direction of a common normal (normal line) to the concave curved portion 222 and the convex curved portion 212 at the contact portion C of the rotation power (F) becomes larger than a component (FT) in a common tangent (tangential line) thereto of the rotation power (F). The rotational direction means a direction orthogonal to a perpendicular line extending across the contact portions C and the rotation axis L and is the direction in which each concave curved portion 222 presses the convex curved portion 212 facing therewith. That is, it is desirable that the concave curved portion 222 and the convex curved portion 212 be formed so that an angle of 45 degrees or smaller is made between the direction of the rotation power (F) with which the concave curved portion 222 presses the convex curved portion 212, and the common normal to the concave curved portion 222 and the convex normal portion 212. Thus, there is restrained a force which causes the motor shaft 17 and the pump shaft 13 to relatively move in the direction of the common tangent to the concave curved portion 222 and the convex curved portion 212, and as a result, it is possible to suppress to a small force a wrenching force in the radial direction which acts on the motor shaft 17 and the pump shaft 13 due to the misalignment or the like.

Referring now back to FIG. 2, the two outer wall surfaces 211 of the coupling protrusion 21 are first formed to be flat, and the two outer wall surfaces 211 are then formed to be lowered or depressed only at the opposite portions in the radial direction of each convex curved portion 212. As a result, the convex curved portions 212 are respectively formed along radially outer edge portions of the two outer wall surfaces 211 and extend along the rotation axis L at positions which are point-symmetrical with respect to the rotation axis L as viewed in the direction of the rotation axis L. On the other hand, the two inner wall surfaces 221 of the coupling recess 22 are first formed to be flat, and then, the concave curved portions 222 are respectively formed on the two inner wall surfaces 221 at positions which are point-symmetrical with respect to the rotation axis L as viewed in the direction of the rotation axis L, and extend along the rotation axis L. That is, the two outer wall surfaces 211 on the coupling protrusion 21 are formed to be depressed only at both side portions in the radial direction of each convex curved portion 212, whereby the convex curved portions 212 are respectively formed along the radially outer edge portions of the two outer wall surfaces 211 and extend along the rotation axis L at the positions which are point-symmetrical with respect to the rotation axis L as viewed in the direction of the rotation axis L, while the concave curved portions 222 are respectively caved on the two inner wall surfaces 221 and extend along the rotation axis L at the positions which are point-symmetrical with respect to the rotation axis L as viewed in the direction of the rotation axis L.

In this way, each outer wall surface 211 formed to be flat on the coupling protrusion 21 is formed to be depressed or subside only at the opposite sides in the radial direction of each convex curved portion 212 to form each convex curved portion 212, while each concave curved portion 222 is formed on each of the inner wall surfaces 221 which are formed to be flat on the coupling recess 22. Thus, it is possible to make large the cross-section area of the coupling protrusion 21 and the cross-section area of the two protruding portions 223 with the inner wall surfaces 221 of the coupling recess 22, and thus, the coupling device 20 is increased in rigidity and can operate smoothly.

Figures 4A, 4B:
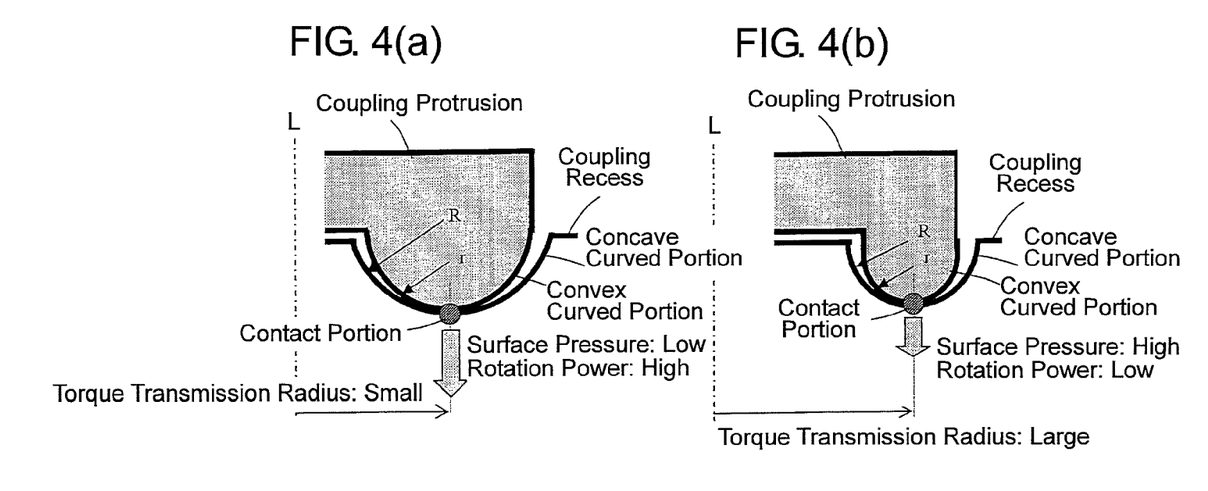
FIGS. 4(a) and 4(b) are explanatory illustrations for explaining difference in surfaces pressure between contact portions of two convex curved portions respectively being large and small in radius.
Figure 4C:
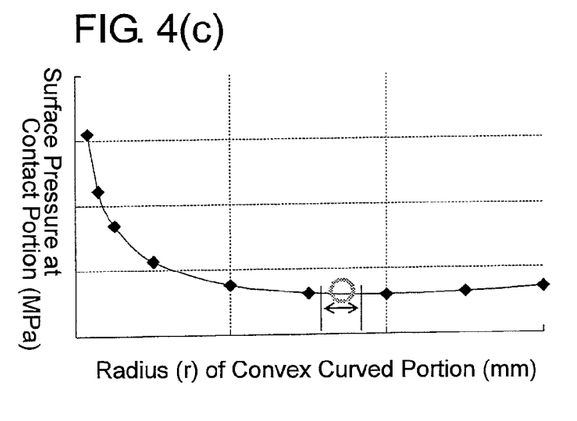
FIG. 4(c) is a graph showing the relation between radius of the convex curved portion and surface pressure at each contact portion.

FIG. 4(c) is a graph showing the relation between the radius (r) of the convex curved portion 212 and the surface pressure at the contact portion C where a predetermined torque is transmitted from the motor shaft 17 to the pump shaft 13 in the state that the direction of the rotation power (F) with which the concave curved portion 222 presses the convex curved portion 212 at each contact portion C coincides with the direction of the common normal to the concave curved portion 222 and the convex curved portion 212 at the contact portion C.

As shown in FIGS. 4(a) and 4(b), the surface pressure at the contact portion C which is calculated by dividing the force in the direction of the common normal to the concave curved portion 222 and the convex curved portion 212 by the area at the contact portion C becomes lower as the radius (r) of the convex curved portion 212 and the radius (R) of the concave curved portion 222 become larger. However, where the radius (r) of the convex curved portion 212 is increased, the torque transmission radius which is the length of the perpendicular from the contact portion C to the rotation axis L becomes smaller as shown in FIG. 4(a) because determination has been made of the width dimension in the radial direction of the outer wall surface 211 on the coupling protrusion 21 of the pump shaft 13, whereby the force in the direction of the common normal becomes larger. Accordingly, as shown in FIG. 4(c), where a predetermined torque is transmitted from the motor shaft 17 to the pump shaft 13, the surface pressure at the contact portion C decreases to a minimum value with increase in the radius (r) of the convex curved portion 212, and after reaching the minimum value, the surface pressure increases with increase in the radius (r). For this reason, where the radius (r) of the convex curved portion 212 is chosen to be approximate to a radius (r) that minimizes the surface pressure at the contact portion C between the convex curved portion 212 and the concave curved portion 222, the surface pressure at the contact portion C is made to be very low, so that it becomes possible to extend the service life of the coupling device 20.

Figure 5:
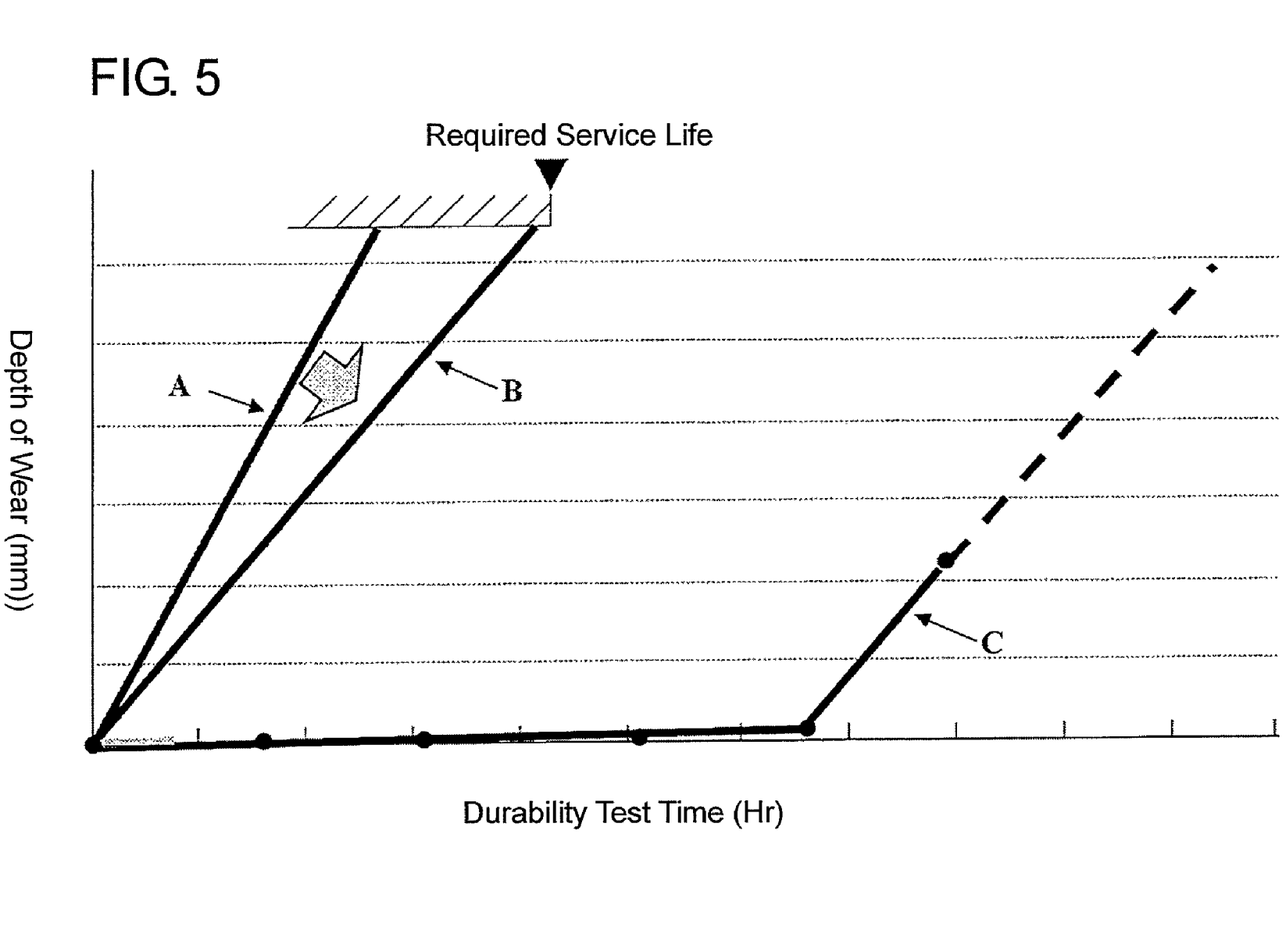
FIG. 5 is a graph showing the relation between depth of wear at contact portion and durability test time.

FIG. 5 is a graph showing the relation between the durability test time and the depth of wear which takes place at the contact portion C between the concave curved portion 222 of the coupling recess 22 and the convex curved portion 212 of the coupling protrusion 21 in the coupling device 20. As apparent from lines A and B in FIG. 5, where the convex curved portion 212 and the concave curved portion 222 are formed respectively on the coupling protrusion 21 and the coupling recess 22 as described above, the depth of wear relative to the durability test time remarkably decreases as indicated by the line B in comparison with the prior art indicated by the line A in which two inner wall surfaces formed to be flat on the coupling recess press the acute radially outer edge corners of the coupling protrusion.

Further, where the motor shaft 17 and the pump shaft 13 are made of steel which has been given a heat treatment such as hardening or the like and are coated with DLC (diamond-like carbon) at the convex curved portions 212 and the concave curved portions 222, the wear at the contact portion C extremely decreases in cooperation with reduction in the surface pressure. Further, at the contact portion C between the convex curved portion 212 and the concave curved portion 222, the exfoliation of the DLC layer can be prevented thanks to smoothness of both of the contact surfaces and decrease in the surface pressure, so that the service life of the coupling device 20 can be extended tremendously. Since the treatment temperature for the DLC coating is as low as 200° C., it does not occur that the motor shaft 17 and the pump shaft 13 made of the steel which has been subjected to the heat treatment deteriorate in hardness. Therefore, the DLC coating is more suitable for surface treatment on the convex curved portions 212 and the concave curved portions 222 of the coupling device than surface treatment with chromium nitride (CrN), titan nitride (TiN) or the like whose temperature for heat treatment is 500° C. or so. As apparent from the lines B and C in FIG. 5, the depth of wear relative to the durability test time tremendously decreases as indicated by the line C in the case that the DLC coating is carried out on the convex curved portions 212 and the concave curved portions 222 formed as described earlier, in comparison with the case (indicated by the line B) that the DLC coating is not carried out. The DLC coating suffices to be carried out not on both of the convex curved portions 212 and the concave curved portions 222, but on at least either the convex curved portions 212 or the concave curved portions 222.

Second Embodiment

Next, a coupling device 60 in a second embodiment according to the present invention will be described with reference to FIG. 6. In the first embodiment, the convex curved portions 212 are formed on the coupling protrusion 21, and the concave curved portions 222 are formed on the coupling recess 22. The second embodiment only differs from the first embodiment in that concave curved portions 612 are formed on a coupling protrusion 61, and convex curved portions 622 are formed on a coupling recess 62. Description will be made regarding this difference only because other respects of the second embodiment are the same as those in the first embodiment.

The coupling device 60 is composed of the coupling protrusion 61 formed on the end of the pump shaft 13 and the coupling recess 62 formed on the end of the motor shaft 17 and engaged with the coupling protrusion 61. The coupling protrusion 61 is formed by forming radially opposed flat surfaces on the end portion of the pump shaft 13 and has two outer wall surfaces 611 extending in parallel with each other in the direction of the rotation axis L. The coupling recess 62 is formed by machining a recessed groove, which is wider in depth than the thickness of the coupling protrusion 61, on the end portion of the motor shaft 17 from an end surface of the end portion to extend across the diameter of the end portion in the direction of the rotation axis L and has two protruding portions 623 which are formed with two inner wall surfaces 621 extending in parallel with each other in the direction of the rotation axis L. The two inner wall surfaces 621 of the coupling recess 62 are first formed to be flat and then, are formed with two convex curved portions 622 at diametrically opposite portions on the two flat inner wall surfaces 621 by being lowered or depressed at both sides only in the radial direction of each convex curved portion 622. As a result, the convex curved portions 622 whose cross-section shape is an arc of a radius (r) are formed respectively on the two inner wall surfaces 621 of the coupling recess 62 along the radially outer edge portions of the two inner wall surfaces 621 and extend along the rotation axis L at positions which are point-symmetrical with respect to the rotation axis L as viewed in the direction of the rotation axis L. On the other hand, two outer wall surfaces 611 of the coupling protrusion 61 are first formed to be flat and then, are formed with two concave curved portions 612 by providing depressions whose cross-section draws an arc of a radius (R) being larger than the radius (r) of the convex curved portions 622, at diametrically opposite portions on the two flat outer wall surfaces 611 facing the convex curved portions 622. Thus, the two concave curved portions 612 are formed on the two outer wall surfaces 611 and extend along the rotation axis L at positions which are point-symmetrical with respect to the rotation axis L as viewed in the direction of the rotation axis L. That is, the two inner wall surfaces 621 of the coupling recess 62 are formed to be depressed at the opposite sides only in the radial direction of each of the convex curved portions 662 thereon, whereby the convex curved portions 622 are formed respectively along the diametrically opposite edge portions of the two inner wall surfaces 621 and extend along the rotation axis L at the positions which are point-symmetrical with respect to the rotation axis L as viewed in the direction of the rotation axis L. On the other hand, the two concave curved portions 612 are formed respectively on the two outer wall surfaces 611 and extend along the rotation axis L at the positions which are point-symmetrical with respect to the rotation axis L as viewed in the direction of the rotation axis L.

Thus, when the pump 11 is rotationally driven by the electric motor 15, the convex curved portions 622 which are formed at the diametrically opposite edge portions on the two inner wall surfaces 621 of the coupling recess 62 of the motor shaft 17 press the concave curved portions 612 which are formed on the two outer wall surfaces 611 of the coupling protrusion 61 of the pump shaft 17 and which extend in the direction of the rotation axis L, whereby a rotation power is transmitted. Since the rotation power is transmitted through the contact portions C between the convex curved portions 622 and the concave curved portions 612 which extend in the direction of the rotation axis, the contact areas at the contact portions C of the convex curved portions 622 and the concave curved portions 612 can be increased to reduce the surface pressure.

In the first and second embodiments, the motor shaft 17 is formed with coupling recess 22, 62, while the pump shaft 13 is formed with the coupling protrusion 21, 61. However, in a modified form, the motor shaft 17 may be formed with the coupling protrusion 21, 61, while the pump shaft 13 may be formed with the coupling recess 22, 62.

In the foregoing embodiments, the two outer wall surfaces 211 of the coupling protrusion 21 and the two inner wall surfaces 621 of the coupling recess 62 are first formed to flat surfaces. However, they may be formed to gentle concave surfaces or convex surfaces or to surfaces with slight irregularities. In short, they may suffice to be surfaces on which the convex curved portions 212, 622 and the concave curved surfaces 222, 612 can be formed.

Third Embodiment

Next, a coupling device 65 in a third embodiment according to the present invention will be described with reference to FIG. 7. In the first embodiment, the motor shaft 17 is formed with the coupling recess 22 as a drive portion, the pump shaft 13 is formed with the coupling protrusion 21 as a driven portion, the coupling recess 22 is firmed with the concave curved portions 222, and the coupling protrusion 21 is formed with the convex curved portions 212. The third embodiment only differs from the first embodiment in that one concave curved portion 662 is formed on a drive wall surface 661 of a drive portion 66 formed on the motor shaft 17, while one convex curved portion 672 is formed on a driven wall surface 671 of a driven portion 67 of the pump shaft 13. Description will be made regarding this difference only because other respects of the third embodiment are the same as those in the first embodiment.

Figure 7:
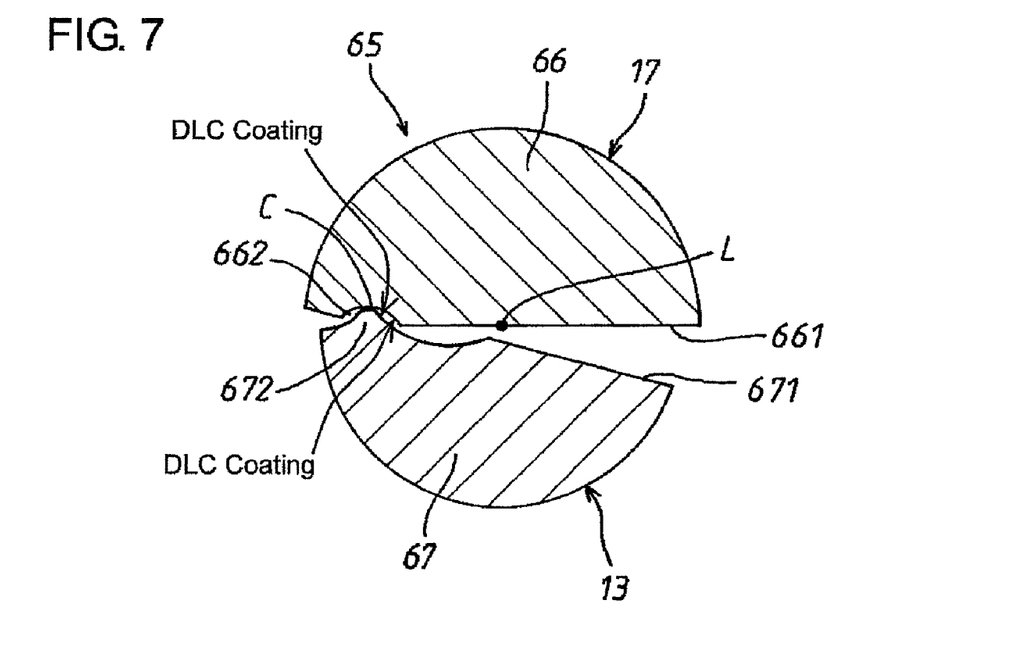
FIG. 7 is a cross-sectional view of a coupling device in a third embodiment according to the present invention.

As shown in FIG. 7, the coupling device 65 is composed of the driven portion 67 formed at the end of the pump shaft 13 and the drive portion 66 formed at the end of the motor shaft 17 and brought into contact with the driven portion 67. The driven portion 67 is formed on the end portion of the pump shaft 13 and has a driven wall surface 671 which faces in the rotational direction and which extends in the direction of the rotation axis L. The drive portion 66 is formed on the end portion of the motor shaft 17 and has the drive wall surface 661 which, like the driven wall surface 671, faces in the rotational direction and which extends in the direction of the rotation axis L in a face-to-face relation with the driven wall surface 671.

The driven wall surface 671 is first formed to be flat and then, is formed with one convex curved portion 672 by being lowered or depressed at opposite portions in the radial direction of the convex curved portion 672 so that the convex curved portion 672 whose cross-section shape represents an arc of a radius (r) is formed at a position spaced from the rotation axis L as viewed in the direction of the rotation axis L and extends along the rotation axis L. The drive wall surface 661 is first formed to be flat, and one concave curved portion 662 whose cross-section shape represents an arc of a radius (R) being larger than the radius (r) of the convex curved portion 672 is then formed on the drive wall surface 661 to extend along the rotation axis L at a position spaced from the rotation axis L as viewed in the direction of the rotation axis L so that the concave curved portion 662 is brought into contact with the convex curved portion 672.

Thus, when the pump 11 is rotationally driven by the electric motor 15, the convex curved portion 672 which is formed at one radially outer edge portion on the driven wall surface 671 of the driven portion 67 of the pump shaft 13 and which extends in the direction of the rotation axis L is pressed by the concave curved surface 662 which is formed at one radially outer edge portion on the drive wall surface 661 of the drive portion 66 of the motor shaft 17 and which extends in the direction of the rotation axis L, whereby a rotation power is transmitted. Since the rotation power is transmitted through a contact portion C between the concave curved portion 662 and the convex curved portion 672 which extend in the direction of the rotation axis L, it is possible to increase the contact area on the contact portion C of the concave curved portion 662 and the convex curved portion 672, and hence, it is possible to reduce the surface pressure on the contact portion C.

In the third embodiment, the concave curved portion 662 is formed on the drive portion 66 formed on the motor shaft 17, while the convex curved portion 672 is formed on the driven portion 67 formed on the pump shaft 13. However, in a modified form, the convex curved portion may be formed on the drive wall surface 661 of the drive portion 66 formed on the motor shaft 17, while the concave curved portion may be formed on the driven wall surface 671 of the driven portion 67 formed on the pump shaft 13.

Further, it is not required that the drive wall surface 661 and the driven wall surface 671 are first formed to be flat. They may be formed to gentle concave or convex surfaces or to surfaces with slight irregularities. In short, they suffice to be surfaces on which the convex curved portion or the concave curved portion can be formed.

In the foregoing embodiments, the convex curved portion 212, 622, 672 is formed to have the cross-section shape representing the arc of the radius (r), while the concave curved portion 222, 612, 662 is formed to have the cross-section shape representing the arc of the radius (R) being larger than the radius (r). However, the curved portions may be formed to have a cross-section shape which is expressed not by an arc but by a curve of higher order such as ellipse. In this modified case, the curvature of the concave curved portion is made to be smaller than that of the convex curved portion in the same manner as the curvature of the arc with the radius (R) of the concave curved portion 222, 612, 662 is smaller than the curvature of the arc with the radius (r) of the convex curved portion 212, 622, 672.

Further, the present invention is not limited to the form wherein the convex curved portion and the concave curved portion which are brought into contact for rotationally coupling the motor shaft 17 as drive shaft with the pump shaft 13 as driven shaft are provided by one or two pairs as described above. Three or more pairs of them may be provided to be brought into contact with each other for rotation coupling. In this modified case, it is desirable to provide the respective shafts with pairs of drive wall surfaces and driven wall surfaces at equiangular intervals about the axis of the shafts and to provide the convex curved portion and the concave curved portion respectively on each pair of the drive and driven wall surfaces.

In the foregoing first and second embodiments, the coupling protrusion or the coupling recess formed on the motor shaft 17 constitutes the drive portion formed on the drive shaft, and the two outer wall surfaces on the coupling protrusion or the two inner wall surfaces on the coupling recess constitute drive wall surfaces which are formed on the drive portion to face in the rotational direction and which extend in the direction of the rotation axis. Further, the coupling protrusion or the coupling recess formed on the pump shaft 13 constitutes the driven portion formed on the driven shaft, and the two outer wall surfaces on the coupling protrusion or the two inner wall surfaces on the coupling recess constitute driven wall surfaces which are formed on the driven portion to face in the rotational direction and which extend in the direction of the rotation axis.

The electric motor 15 and the motor shaft 17 in the foregoing embodiments are one example of a drive device and a drive shaft of the drive device, whereas the pump 11 and the pump shaft 13 are one example of an operation device and a driven shaft of the operation device. The coupling device 20, 60, 65 is applicable not only to the rotation coupling between the motor shaft 17 of the electric motor 15 and the pump shaft 13 of the pump 11, but also to a rotation coupling between a drive shaft of another drive device and a driven shaft of another operation device.

Figure 8:
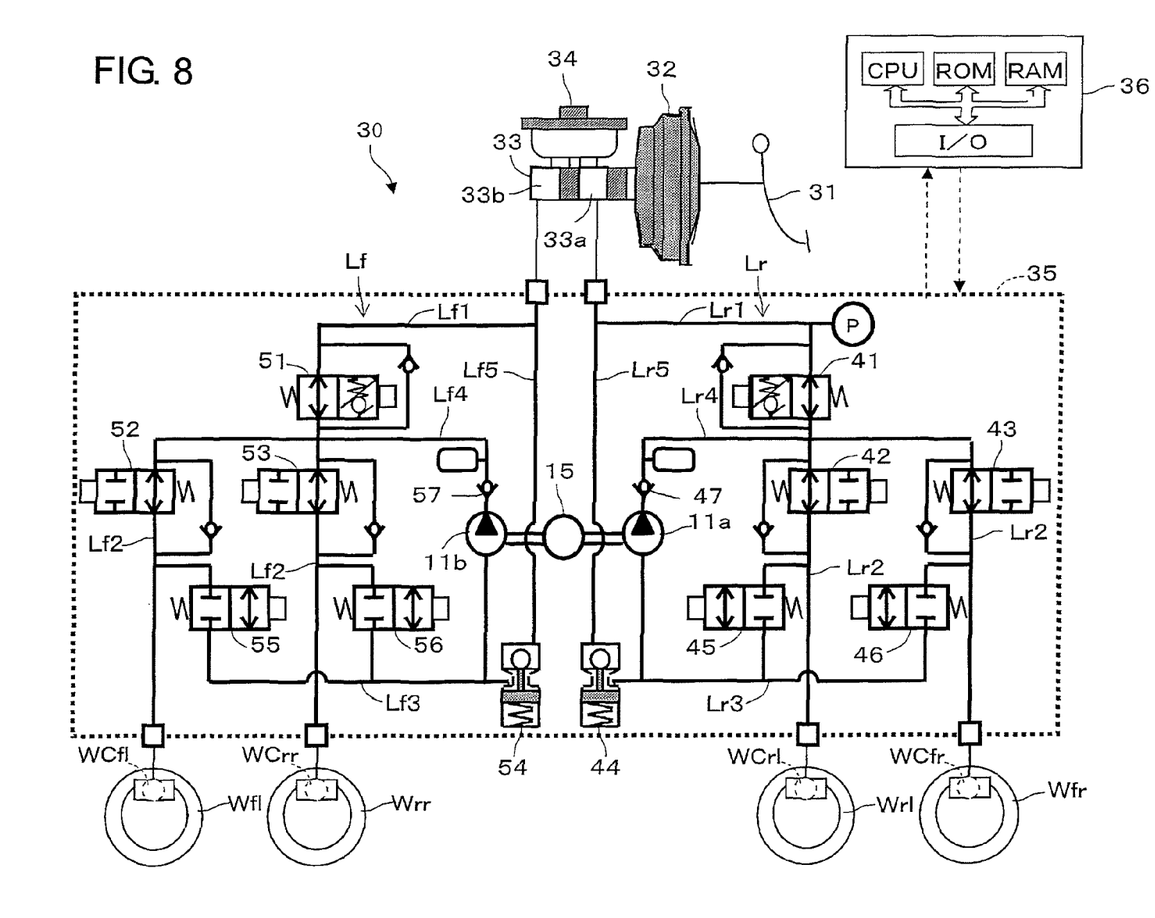
FIG. 8 is a circuit diagram showing a hydraulic circuit in a vehicle brake system.

Next, one example of a vehicle brake system 30 to which the coupling device 20, 60, 65 is applied will be described with reference to FIG. 8. The vehicle brake system 30 for supplying a brake force to left and right front wheels Wfl, Wfr and left and right rear wheels Wrl, Wrr is composed of wheel cylinders WCfl, WCfr, WCrl, WCrr provided for respective wheels Wfl, Wfr, Wrl, Wrr, a vacuum booster 32 which is a booster device for assisting and boosting (enhancing) a brake manipulation force given by the stepping manipulation of the brake pedal 31 upon receiving an intake vacuum of an engine on a diaphragm thereof, a master cylinder 33 for generating a brake hydraulic pressure corresponding to the brake manipulation force boosted by the vacuum booster 32, to supply the brake hydraulic pressure to the respective wheel cylinders WCfl, WCfr, WCrl, WCrr, a reservoir tank 34 storing brake fluid for replenishing the same to the master cylinder 33, an automatic brake hydraulic pressure generating device 35 provided between the master cylinder 33 and the respective wheel cylinders WCfl, WCfr, WCrl, WCrr for generating hydraulic pressures regardless of the stepping state of the brake pedal 31 to supply the hydraulic pressures to the controlled object wheels, and a brake control ECU (electronic control unit) 36 for controlling the automatic brake hydraulic pressure generating device 35. When hydraulic pressures are applied to the respective wheel cylinders WCfl, WCfr, WCrl, WCrr, brake pads are pressed against disc rotors of the respective wheels Wfl, Wfr, Wrl, Wrr, so that the same are supplied with brake forces.

The automatic brake hydraulic pressure generating device 35 is generally well-known in the art and is constructed by hydraulic control valves 41, 51 serving as master cylinder cut valves, pressure increasing valves 42, 43, 52, 53 and pressure reducing valves 45, 46, 55, 56 which are electromagnetic valves constituting ABS control valves, pressure regulation reservoirs 44, 54, an electric motor 15, and a tandem pump 11 with first and second pumps 11a,11b rotationally driven by the electric motor 15.

The automatic brake hydraulic pressure generating device 35 is provided with first and second fluid passages Lr, Lf which are respectively connected to first and second pressure chambers 33a, 33b of the master cylinder 33. The first fluid passage Lr is for bringing the first pressure chamber 33a into communication with the wheel cylinders WCrl, WCfr of the left rear wheel Ml and the right front wheel Wfr, while the second fluid passage Lf is for brining the second pressure chamber 33b into communication with the wheel cylinders WCfl, WCrr of the left front wheel Wfl and the right rear wheel Wrr.

The first fluid passage Lr of the automatic brake hydraulic pressure generating device 35 is provided with a hydraulic control valve 41 of the linearly controlled type constituted by a pressure difference control valve. The hydraulic control valve 41 is controllable by the brake control ECU 36 selectively to a communication state and a pressure difference state. The hydraulic control valve 41 is normally held in the communication state without being energized, but when brought into the pressure difference state by being energized, is able to hold the fluid passage Lr2 on the wheel cylinders WCrl, WCfr side to be higher in pressure by a predetermined controlled pressure difference than the fluid passage Lr1 on the master cylinder 33 side. The controlled pressure difference is regulatable in dependence on a control current from the brake control ECU 36.

The first fluid passage Lr is branched to two fluid passages Lr2, Lr2. One of the branch passages Lr2 is provided with the pressure increasing valve 42 for controlling the pressure increase of brake hydraulic pressure supplied to the wheel cylinder WCrl in a pressure increase mode under the ABS control, and the other branch passage Lr2 is provided with the pressure increasing valve 43 for controlling the pressure increase of brake hydraulic pressure supplied to the wheel cylinder WCfr in the pressure increase mode under the ABS control. Each of the pressure increasing valves 42, 43 is constituted as a two-position valve which is controllable by the brake control ECU 36 to be brought selectively into either of the communication and blocked states. Each of the pressure increasing valves 42, 43 is a normally open electromagnetic shutoff valve which is in a communication state when held deenergized, but is brought into a blocked state when energized. Then, when controlled to be held in the communication state, the pressure increasing valves 42, 43 are able to apply a hydraulic pressure supplied from the master cylinder 33 or/and a hydraulic pressure supplied by operating the pump 11 and by controlling the hydraulic control valve 41, to the respective wheel cylinders WCrl, WCfr. Further, the pressure increasing valves 42, 43 are able to perform the ABS control in cooperation with the pressure reducing valves 45, 46 and the pump 11. At the time of an ordinary or normal braking wherein the ABS control is not being performed, the pressure increasing valves 42, 43 are controlled to be continually in the communication state.

The fluid passages Lr2 between the pressure increasing valves 42, 43 and the respective wheel cylinders WCrl, WCfr communicate with the pressure regulation reservoir 44 through a fluid passage Lr3. The fluid passage Lr3 has arranged thereon the pressure reducing valves 45, 46 each of which is controllable by the brake control ECU 36 to be brought selectively into either of communication and blocked states. The pressure reducing valves 45, 46 are normally closed electromagnetic shutoff valves each of which is in a blocked state when held deenergized, but is brought into the communication state when energized. The pressure reducing valves 45, 46 are so constructed that they are continually held in the blocked state at the time of the normal braking state (at the time of the ABS not operating), but when timely brought into the communication state at the time of the ABS control, serve to drain the brake fluids through the fluid passage Lr3 to the pressure regulation reservoir 44, so that the brake hydraulic pressures in the wheel cylinders WCrl, WCfr are controlled.

The first pump 11a of the tandem pump 11 is connected together with a one-way or check valve 47 on a fluid passage Lr4 which connects the fluid passage Lr2 between the hydraulic control valve 41 and the pressure increasing valves 42, 43 to the pressure regulation reservoir 44. Additionally, a fluid passage Lr5 is provided to connect the pressure regulation reservoir 44 to the master cylinder 33 through the fluid passage Lr1. The tandem pump 11 is drivable by the electric motor 15 responsive to a command from the brake control ECU 36. In a pressure reducing mode under the ABS control, the first pump 11a draws brake fluids in the wheel cylinders WCrl, WCfr or the brake fluid stored in the pressure regulation reservoir 44 to return the drawn brake fluid to the master cylinder 33 through the hydraulic control valve 41 held in the communication state.

Further, in executing a control that automatically applies a hydraulic pressure to any of the wheel cylinders WCfl-WCrr under a traction control, a yaw control or the like for the vehicle, it is required to make the hydraulic control valve 41 having been switched to a pressure difference state, generate a controlled pressure difference. At this time, the first pump 11a draws the brake fluid within the master cylinder 33 through the fluid passages Lr5 and the pressure regulation reservoir 44 and supplies the drawn brake fluid to the respective wheel cylinders WCrl, WCfr through the fluid passages Lr4, Lr2 and the pressure increasing valves 42, 43 held in the communication state.

The second fluid passage Lf of the automatic brake hydraulic pressure generating device 35 is composed of fluid passages Lf1-Lf5 similar to those of the first fluid passage Lr. The second fluid passage Lf is provided thereon with a hydraulic control valve 51 and a pressure regulation reservoir 54. Branch fluid passages Lf2, Lf2 communicating respectively with the wheel cylinders WCfl, WCrr are provided thereon with pressure increasing valves 52, 53, and the fluid passage Lf3 is provided thereon with pressure reducing valves 55, 56. The fluid passage Lf4 is provided thereon with the second pump 11b of the pump 11 and a one-way or check valve 57. As mentioned above, the second fluid passage Lf of the automatic brake hydraulic pressure generating device 35 is similar to the first fluid passage Lr, and thus, detailed description will be omitted regarding the second fluid passage Lf.

The brake control ECU 36 is for controlling a control system for the vehicle brake system 30 and is constituted by a well-known microcomputer incorporating a CPU, a ROM, a RAM, an I/O interface and the like. The ECU 36 executes various kinds of controls in accordance with programs stored in the ROM to control the brake forces applied to the respective wheels Wfl, Wfr, Wrl, Wrr.

Figure 9:
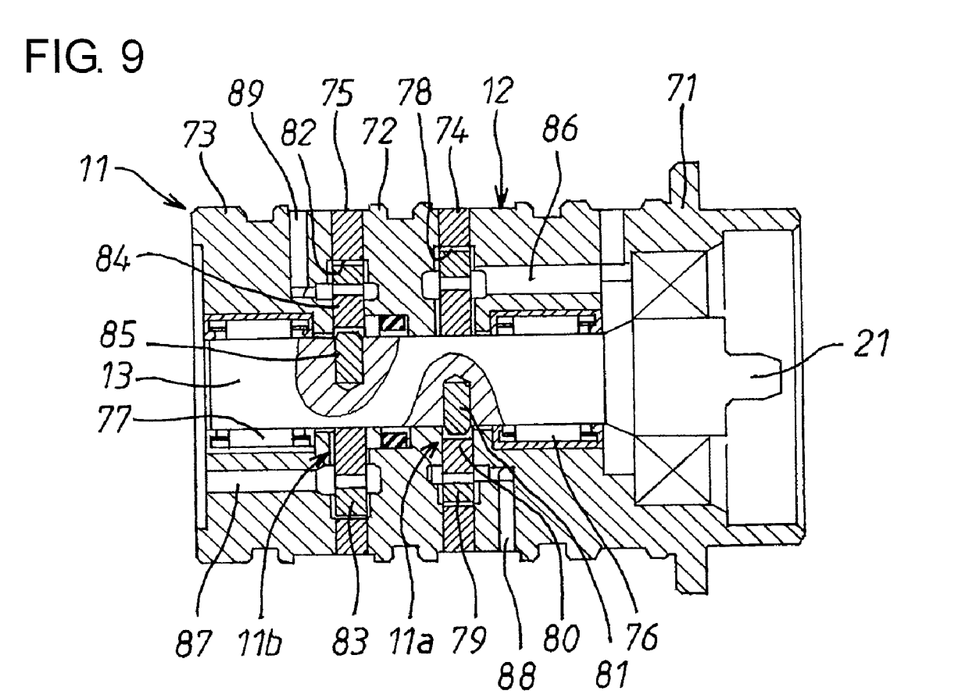
FIG. 9 is a longitudinal sectional view of a tandem pump.

Next, the tandem pump 11 will be described in detail with reference to FIG. 9. A housing 12 of the pump 11 is constructed so that first and second housing plates 74, 75 are secured in respective spaces between first to third housing members 71, 72, 73 with their contact surfaces sealed. The pump shaft 13 is arranged to pass through the housing 12, and opposite ends thereof are rotatably supported by the first and third housing members 71, 73 through bearings 76, 77.

The first pump 11a is received in a pump receiving space 78 which is partitioned by facing surfaces of the first and second housing members 71, 72 and an eccentric bore which is formed in the first housing plate 74 to be eccentric from the pump shaft 13. The first housing plate 74 rotatably fits an inner gear 79 in the eccentric bore thereof, and an outer gear 80 meshing with the inner gear 79 is fitted on the pump shaft 13 and is prevented by a key 81 not to rotate relative to the pump shaft 13.

The second pump 11b is received in another pump receiving space 82 which is partitioned by facing surfaces of the second and third housing members 72, 73 and another eccentric bore which is formed in the second housing plate 75 to be eccentric from the pump shaft 13. The second housing plate 75 rotatably fits another inner gear 83 in the eccentric bore thereof, and another outer gear 84 meshing with the inner gear 83 is fitted on the pump shaft 13 and is prevented by a key 85 not to rotate relative to the pump shaft 13.

Spaces formed between the inner gears 79, 83 and the outer gears 80, 84 are partitioned by partitioning members into suction chambers and discharge chambers, and the suction chambers are connected by suction passages 86, 87 to the pressure regulation reservoirs 44, 54 sides on the passages Lr4, Lf4, whereas the discharge chambers are connected by discharge passages 88, 89 to the hydraulic control valves 41, 51 sides on the passages Lr4, Lf4. The pump shaft 13 of the tandem pump 11 is formed at the end portion thereof with the coupling protrusion 21, which is rotationally coupled to the motor shaft 17 of the electric motor 15 through the aforementioned coupling device 20.

In the vehicle brake system 30, the motor shaft 17 and the pump shaft 13 are decreased in diameter with the downsizing and weight reduction of the electric motor 15 and the pump 11, and the operation of the pump 11 driven by the electric motor 15 remarkably increases in frequency as well as in the time period of use, so that the load acting on the coupling device 20 increases. Further, where the pump 11 is made as tandem type to drive the first and second pumps 11a, 11b by the single pump shaft 13, the rotation power acting on the coupling device 20 is further increased.

The coupling device 20, 60, 65 according to the foregoing embodiments can lower or reduce the surface pressure generated at the contact portions C between the convex curved portions 212, 622, 672 and the concave curved portions 222, 612, 662 to decrease the wear at the contact portions C even if a high rotation power acts in such a severe or hard condition and therefore, can transmit the high rotation power from the motor shaft 17 to the pump shaft 13 over a long service life smoothly and gently. As a consequence, it is possible to make the vehicle brake system 30 downsized, light-weighted, increased in durability and enhanced in the capability of being mounted on vehicles.

Various features and many of the attendant advantages in the foregoing first to third embodiments will be summarized as follows:

In the coupling device 20, 65 in the foregoing first embodiment typically shown in FIGS. 1 and 2 and in the third embodiment shown in FIGS. 1 and 7, the convex curved portion 212, 672 is formed on one of the drive wall surface 221, 661 of the drive portion 22, 66 formed on the drive shaft 17 and the driven wall surface 211, 671 of the driven portion 21, 67 formed on the driven shaft 13 and extends along the rotation axis L at the position spaced from the rotation axis L as viewed in the direction of the rotation axis L, and the concave curved portion 222, 662 having a smaller curvature (R) than that (r) of the convex curved portion 212, 672 is formed on the other of the drive wall surface 221, 661 and the driven wall surface 211, 671 and extends along the rotation axis L at the position spaced from the rotation axis L as viewed in the direction of the rotation axis L to contact the convex curved portion 212, 672. Thus, when a rotation power is transmitted from the drive shaft 17 to the driven shaft 13, the surface pressure at the contact portion C between the convex curved portion 212, 672 and the concave curved portion 222, 662 is made to be low or small. As a result, wears at the contact portion C of the concave curved portion 222, 662 and the convex curved portion 212, 672 decrease, and the relative movement caused by the misalignment between the drive shaft 17 and the driven shaft 13 becomes smooth, so that it is possible to extend the service life of the coupling device 20, 65 and to operate the same gently and smoothly.

Also in the coupling device 20 in the foregoing first embodiment typically shown in FIGS. 1 and 2, the convex curved portions 212, 212 are respectively formed on the two outer wall surfaces 211, 211 of the coupling protrusion 21 which is formed on one of the drive shaft 17 and the driven shaft 13 arranged on the rotation axis L, and extend along the rotation axis L at the positions which are point-symmetrical with respect to the rotation axis L as viewed in the direction of the rotation axis L. The concave curved portions 222, 222 each having a smaller curvature (R) than that (r) of the corresponding one of the convex curved portions 212, 212 are respectively formed on the two inner wall surfaces 221, 221 of the coupling recess 22 which is formed on the other of the drive shaft 17 and the driven shaft 13 and which is engaged with the coupling protrusion 21, and extend along the rotation axis L at the positions which are point-symmetrical with respect to the rotation axis L as viewed in the direction of the rotation axis L, and to contact the convex curved portions 212, 212. Thus, when a rotation power is transmitted from the drive shaft 17 to the driven shaft 13, the surface pressure at the contact portion C between each convex curved portion 212 and the corresponding concave curved portion 222 is made to be low or small. As a result, wears at the contact portions C, C of the concave curved portions 222, 222 and the convex curved portion 212, 212 decrease, and the relative movement caused by the misalignment therebetween becomes smooth, so that it is possible to extend the service life of the coupling device 20 and to operate the same gently and smoothly.

Figure 6:
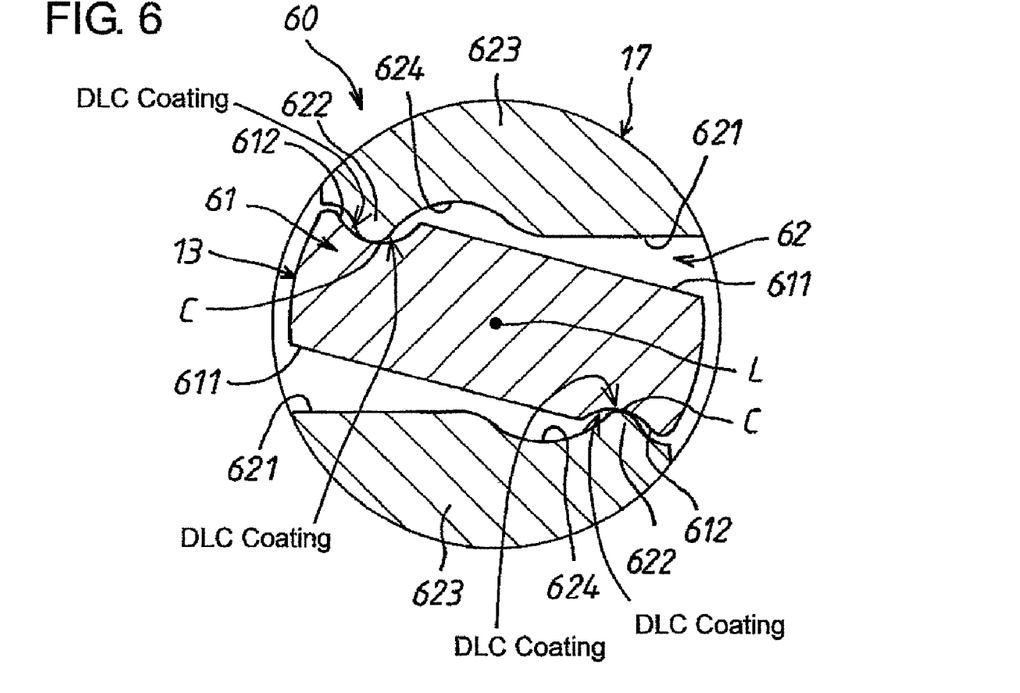
FIG. 6 is a cross-sectional view of a coupling device in a second embodiment according to the present invention.

In the coupling device 60 in the foregoing second embodiment typically shown in FIGS. 1 and 6, the convex curved portions 622, 622 are respectively formed on the two inner wall surfaces 621, 621 of the coupling recess 62 which is formed on one of the drive shaft 17 and the driven shaft 13 arranged on the rotation axis L, and extend along the rotation axis L at the positions which are point-symmetrical with respect to the rotation axis L as viewed in the direction of the rotation axis L. The concave curved portions 612, 612 each having a smaller curvature than that of the corresponding one of the convex curved portions 622, 622 are respectively formed on the two outer wall surfaces 611, 611 of the coupling protrusion 61 which is formed on the other of the drive shaft 17 and the driven shaft 13 and which is engaged with the coupling recess 62, and extend along the rotation axis L at the positions which are point-symmetrical with respect to the rotation axis L as viewed in the direction of the rotation axis L, to contact the convex curved portions 622, 622. Thus, it is possible for the coupling device 60 in the second embodiment to perform substantially the same functions and effects as the coupling device 20 in the first embodiment does.

In each of the forgoing first to third embodiments, as typically shown in FIG. 3, the convex curved portion 212 and the concave curved portion 222 are formed so that a component (FN) in the direction of a common normal to the convex curved portion 212 and the concave curved portion 222 of a force (F) with which one of the convex curved portion 212 and the concave curved portion 222 presses the other thereof at the contact portion C therebetween becomes larger than a component (FT) in the direction of a common tangent to the convex curved portion 212 and the concave curved portion 222 at the contact portion C of the force (F). Thus, since the component (FT) in the direction of the common tangent to the convex curved portion 212 and the concave curved portion 222 of the force (F) with which one of the convex curved portion 212 and the concave curved portion 222 presses the other thereof in the rotational direction can be made to be smaller than the component (FN) in the direction of the common normal thereto of the force (F), it is possible to decrease a wrenching force in a radial direction which acts on both of the shafts 17, 13 due to dimensional errors, misalignment and the like.

In each of the forgoing first to third embodiments, as typically shown in FIG. 4(c), since the curvature of the convex curved portion 212, 622, 672 is chosen to be approximate to a curvature that makes lowest the surface pressure at the contact portion C between the convex curved portion 212, 622, 672 and the concave curved portion 222, 612, 662, it is possible to make the surface pressure at the contact portion C small remarkably, with the result that the service life of the coupling device can be extended.

In each of the forgoing first to third embodiments, as typically shown in FIGS. 2, 6 and 7, the wall surface 211, 621, 671 with the convex curved portion 212, 622, 672 provided thereon is formed to be depressed only at both side portions in the radial direction of the convex curved portion 212, 622, 672 so that the convex curved portion 212, 622, 672 is formed along a radially outer edge portion of the wall surface 211, 621, 671 and extends along the rotation axis L. The concave curved portion 222, 612, 662 is concaved to face the convex curved portion 212, 622, 672 and extends along the rotation axis L. Thus, the portions where the convex curved portion 212, 622, 672 and the concave curved portion 222, 612, 662 are provided on the drive shaft 17 and the driven shaft 13 are increased in cross-section to enhance rigidity, so that it becomes possible to extend the service life of the coupling device and to operate the same smoothly.

In each of the forgoing first to third embodiments, since in cooperation with reduction in the surface pressure at the contact portion C, the diamond-like carbon coating given on at least one of the convex curved portion 212, 622, 672 and the concave curved portion 222, 612, 662 serves to remarkably decrease the wears at the contact portion C of the convex curved portion 212, 622, 672 and the concave curved portion 222, 612, 662. Thus, thanks to the smooth shapes of the contact surfaces and the reduction in the surface pressure, the diamond-like carbon layer can be prevented from being exfoliated at the contact portion C between the convex curved portion 212, 622, 672 and the concave curved portion 222, 612, 662, so that the service life of the coupling device can be extended remarkably. Further, since the diamond-like carbon coating is carried out at a lower treatment temperature, it does not occur that the drive shaft 17 and the driven shaft 13 made of the steel which has been heat-treated are lowered in hardness.

In each of the forgoing first and second embodiments, as typically shown in FIGS. 1, 2 and 6, in order to transmit a rotation power from the motor shaft 17 of the electric motor 15 to the pump shaft 13 of the pump 11, one of the motor shaft 17 and the pump shaft 13 is formed with the coupling protrusion 21, 61 while the other thereof is formed with the coupling recess 22, 62, and one of the coupling protrusion 21, 61 and the coupling recess 22, 62 is formed with the convex curved portions 212, 622, while the other thereof is formed with the concave curved portions 222, 612 which are smaller in curvature than the convex curved portions 212, 622. Thus, for example, even where a high or large rotation power acts on the contact portions C between the convex curved portions 212, 622 and the convex curved portions 222, 612 due to decreases in diameter of the motor shaft 17 and the pump shaft 13, the surface pressure acting on each contact portion C can be lowered to decrease the wear at the contact portion. Therefore, it becomes possible to transmit a high or large rotation power from the motor shaft 17 to the pump shaft 13 smoothly and gently over a long service life, so that a vehicle brake system incorporating the coupling device 20, 60 can be downsized, reduced in weight, enhanced in durability and improved in the capability of being mounted on vehicles. Further, even where the time period and the frequency in use of the pump 11 driven by the electric motor 15 in the vehicle brake system are increased, it becomes possible to extend the service life of the coupling device 20, 60 and hence, of the brake system.

Obviously, numerous other modifications and variations of the present invention are possible in light of the above teachings. It is therefore to be understood that within the scope of the appended claims, the present invention may be practiced otherwise than as specifically described herein.

What is claimed is:

1. A coupling device for rotationally coupling a drive shaft of a drive device and a driven shaft of an operation device which are arranged on a rotation axis, the coupling device comprising:
   a drive portion formed on the drive shaft to face in the circumferential direction and having a drive wall surface extending in the direction of the rotation axis;
   a driven portion formed on the driven shaft to face the drive wall surface and having a driven wall surface extending in the direction of the rotation axis;
   a convex curved portion formed on one of the drive wall surface and the driven wall surface and extending along the rotation axis at a position spaced from the rotation axis as viewed in the direction of the rotation axis; and
   a concave curved portion having a smaller curvature than that of the convex curved portion and formed on the other of the drive wall surface and the driven wall surface to contact the convex curved portion and extending along the rotation axis at a position spaced from the rotation axis as viewed in the direction of the rotation axis.

2. The coupling device as set forth in claim 1, wherein:
   the convex curved portion and the concave curved portion are formed so that a component in the direction of a common normal to the convex curved portion and the concave curved portion at a contact portion of a force with which one of the convex curved portion and the concave curved portion presses the other thereof at the contact portion therebetween becomes larger than a component in the direction of a common tangent to the convex curved portion and the concave curved portion at the contact portion of the force.

3. The coupling device as set forth in claim 1, wherein:
   the wall surface with the convex curved portion provided thereon is formed to be depressed only at both side portions of the convex curved portion as viewed in the direction of the rotation axis so that the convex curved portion is formed along a radial outer edge portion of the wall surface and extends along the rotation axis; and
   the concave curved portion is concaved to face the convex curved portion and extends along the rotation axis.

4. The coupling device as set forth in claim 1, wherein:
   the drive shaft and the driven shaft is made of steel on which heat treatment has been performed; and
   at least one of the convex curved portion and the concave curved portion is coated with diamond-like carbon.

5. The coupling device as set forth in claim 1, wherein:
   the drive device is an electric motor in a vehicle brake system;
   the drive shaft is a motor shaft of the electric motor;
   the operation device is a pump driven by the electric motor; and
   the driven shaft is a pump shaft of the pump.

6. A coupling device for rotationally coupling a drive shaft of a drive device and a driven shaft of an operation device which are arranged on a rotation axis, the coupling device comprising:
   a coupling protrusion formed on one of the drive shaft and the driven shaft and having two outer wall surfaces extending mutually in parallel in the direction of the rotation axis;
   a coupling recess formed on the other of the drive shaft and the driven shaft and having two inner wall surfaces extending mutually in parallel in the direction of the rotation axis to be engaged with the coupling protrusion;
   convex curved portions respectively formed on the two outer wall surfaces of the coupling protrusion and extending along the rotation axis at positions which are point-symmetrical with respect to the rotation axis as viewed in the direction of the rotation axis; and
   concave curved portions each having a smaller curvature than that of a corresponding one of the convex curved portions and respectively formed on the two inner wall surfaces of the coupling recess and extending along the rotation axis at positions which are point-symmetrical with respect to the rotation axis as viewed in the direction of the rotation axis, to contact the convex curved portions.

7. The coupling device as set forth in claim 6, wherein:
   each of the convex curved portions and the corresponding concave curved portion are formed so that a component in the direction of a common normal to each convex curved portion and the corresponding concave curved portion at a contact portion of a force with which one of each convex curved portion and the corresponding concave curved portion presses the other thereof at the contact portion therebetween becomes larger than a component in the direction of a common tangent to each convex curved portion and the corresponding concave curved portion at the contact portion of the force.

8. The coupling device as set forth in claim 6, wherein:
   the wall surface with each of the convex curved portions provided thereon is formed to be depressed only at both side portions of each convex curved portion as viewed in the direction of the rotation axis so that each convex curved portion is formed along a radial outer edge portion of the wall surface and extends along the rotation axis; and each of the concave curved portion is concaved to face the corresponding convex curved portion and extends along the rotation axis.

9. The coupling device as set forth in claim 6, wherein:

the drive shaft and the driven shaft is made of steel on which heat treatment has been performed; and at least either of the convex curved portions and the concave curved portions are coated with diamond-like carbon.

10. The coupling device as set forth in claim 6, wherein:

the drive device is an electric motor in a vehicle brake system;

the drive shaft is a motor shaft of the electric motor;

the operation device is a pump driven by the electric motor; and the driven shaft is a pump shaft of the pump.

* * * * *